United States Patent [19]
Stenberg

[11] Patent Number: 5,431,180
[45] Date of Patent: Jul. 11, 1995

[54] APPARATUS FOR DISINFECTION OF A SANITARY FACILITY OR SANITARY EQUIPMENT

[75] Inventor: Kaj O. Stenberg, Loddenkopinge, Sweden

[73] Assignee: Arjo Hospital Equipment AB, Eslov, Sweden

[21] Appl. No.: 217,093

[22] Filed: Mar. 23, 1994

[30] Foreign Application Priority Data

Apr. 6, 1993 [SE] Sweden .................................. 9301135

[51] Int. Cl.⁶ ................................................ B08B 9/02
[52] U.S. Cl. ..................... 134/100.1; 134/104.1; 134/166 R; 134/201
[58] Field of Search .............. 134/104.1, 100.1, 166 R, 134/201, 94.1, 95.3; 4/222, 662

[56] References Cited

U.S. PATENT DOCUMENTS

| | | | |
|---|---|---|---|
| 2,740,414 | 4/1956 | Moskow | 134/100.1 X |
| 3,689,732 | 3/1975 | Garvey et al. | |
| 3,742,520 | 7/1973 | Bernardi | 4/662 |
| 3,747,129 | 7/1973 | Dyar | 4/662 |
| 3,810,787 | 5/1974 | Yoeli et al. | |
| 3,837,011 | 2/1974 | McTighe et al. | |
| 4,233,692 | 11/1980 | Sinsley | 4/662 |
| 4,345,343 | 8/1982 | Shipman | 134/100.1 X |
| 4,414,998 | 11/1983 | Rudler et al. | 137/216 |
| 4,872,225 | 10/1989 | Wagner | 4/662 |
| 4,922,943 | 5/1990 | Gill | 137/1 |
| 5,193,563 | 3/1993 | Melch | 134/100.1 |

FOREIGN PATENT DOCUMENTS

| | | |
|---|---|---|
| 55971/90 | 1/1992 | Australia . |
| 0195271 | 9/1986 | European Pat. Off. . |
| 274588 | 7/1988 | European Pat. Off. ................. 4/662 |
| 1773932 | 9/1971 | Germany . |
| 2831792 | 1/1980 | Germany . |
| 3003591 | 6/1984 | Germany . |
| 4016737 | 12/1991 | Germany . |
| 1178051 | 7/1989 | Japan . |
| 1178053 | 7/1989 | Japan . |
| 5220050 | 9/1991 | Japan . |

*Primary Examiner*—Frankie L. Stinson
*Attorney, Agent, or Firm*—Ladas & Parry

[57] ABSTRACT

An apparatus for showering and disinfection of a sanitary facility includes a first shower, a first operating device for opening or closing the supply of liquid to the first shower, and a first conduit for supplying water to the shower. A tank is disposed in the first conduit and is connected, via a first inlet pipe of the first conduit, to a supply pipe and is connected by a second conduit section, to the shower. The first conduit section discharges in the tank above a highest permitted filling level, whereby there is created an air gap between liquid in the tank and the discharge of the conduit section. Downstream of the air gap, a device is coupled in for the supply of disinfectant to the storage space of the tank, or to the second conduit section.

22 Claims, 2 Drawing Sheets

APPARATUS FOR DISINFECTION OF A SANITARY FACILITY OR SANITARY EQUIPMENT

FIELD OF THE INVENTION

The present invention relates to an apparatus for showering and disinfection of a sanitary facility or sanitary equipment. The apparatus includes at least a first shower, and a first operating device for opening and closing the flow of liquid to said first shower. Water is supplied to the first shower through a first conduit.

BACKGROUND

There is needed in many contexts to be able, in a simple and rapid manner, to disinfect sanitary facilities and washing areas and the equipment located there. Such needs exist, for example, at hospitals, nursing facilities, public baths, sports centers etc. It is highly desirable in such contexts that the disinfectant can be supplied to the sanitary facility by a simple operation, for example employing a permanently installed shower apparatus already available in the sanitary facility. In such applications, use is often made of permanent installations which are connected to the water mains. In these installations, the disinfectant is added and mixed with water which is taken from the water mains. In such instance, there is a certain risk that, in the event of partial vacuum in the water mains, the disinfectant is sucked back into the mains. Since the water mains also distribute drinking water, even a minor risk of such resuction is, naturally, unacceptable. In order to prevent resuction of, for example, hot water, through a faucet or from a water heater, use is normally made of one or more non-return valves. Since a resuction of disinfectant may have very serious consequences, the safety afforded by one or more non-return valves is considered insufficient.

SUMMARY OF THE INVENTION

The present invention discloses a technique which satisfies the above-outlined needs at the same time as the contemplated increased level of safety against resuction is achieved. According to the invention, a technique is employed which wholly precludes every possibility of resuction of water mixed with disinfectant, or undiluted disinfectant. This is achieved by coupling a tank into the first conduit, the first conduit having a first section discharging in said tank above a highest permitted filling level thereof. The first conduit further includes a second conduit section which is connected to the storage space of said tank for liquid and to said first shower. Liquid is transported from the tank to said first shower through said second conduit section. The second conduit is connected to the storage space of the tank at a level located below the highest filling level of the tank. A device is provided for supplying disinfectant to the tank or to the second conduit section.

BRIEF DESCRIPTION OF THE FIGURES OF THE DRAWING

The present invention will now be described in greater detail hereinbelow with reference to a number of figures, in which.

DETAILED DESCRIPTION

Figure 1:
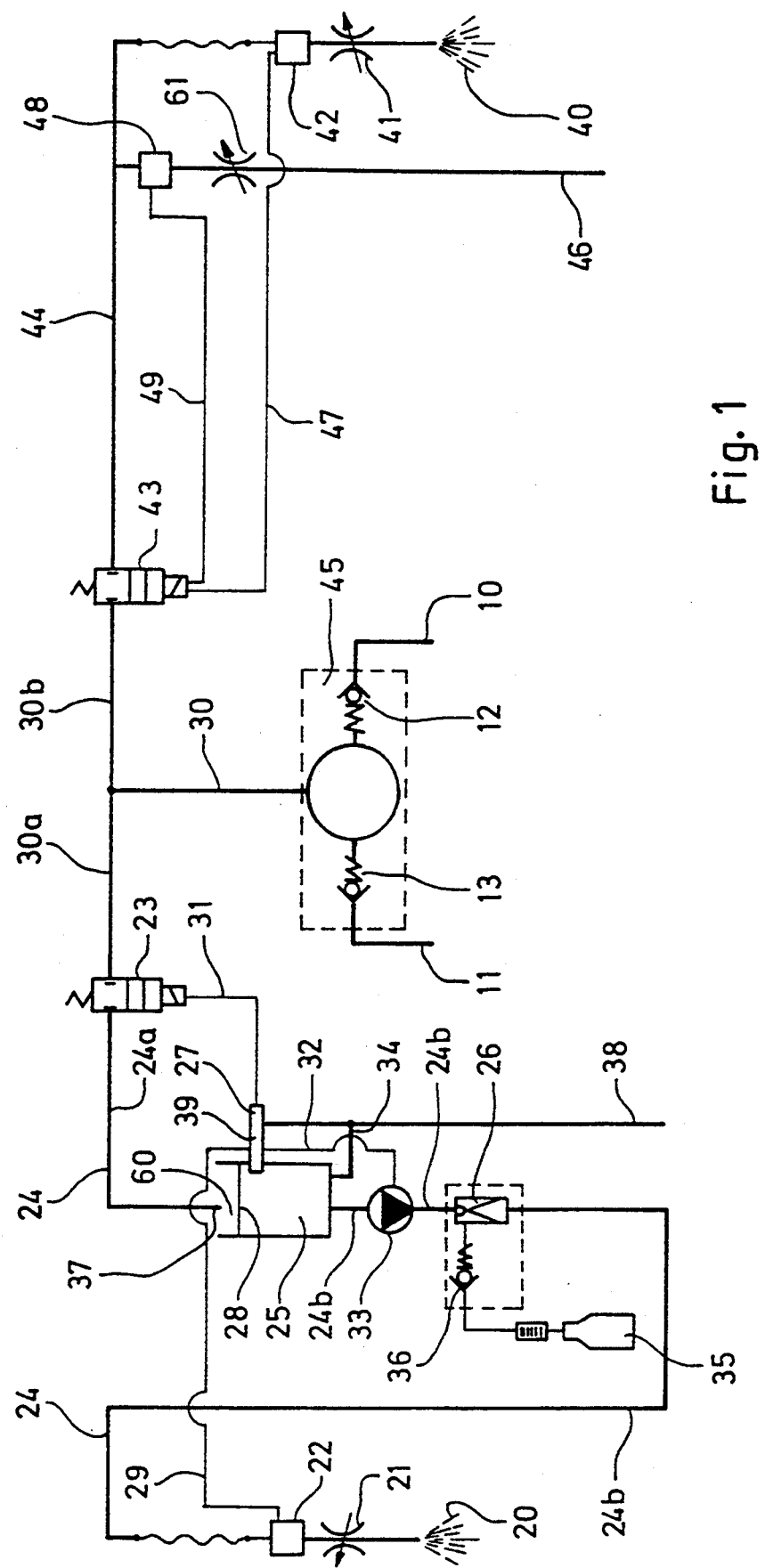
FIG. 1 shows a first embodiment of the apparatus.

Referring to the drawings, FIG. 1 is a skeleton diagram of one embodiment of an apparatus according to the invention. The apparatus comprises a first shower 20, a first operating device 22 for turning the first shower on or off, a first conduit 24 for supplying water to the first shower 20 from a supply pipe 30, 30a and a first valve 23 (switch) for opening or closing the supply of water to the first conduit 24. A conventional regulator 21 for adjusting the volume of the liquid flow is, as a rule, provided in the first conduit 24. The regulator 21 is generally included in the first operating device 22.

A faucet 45 for mixing hot and cold water, preferably a thermostat faucet, is generally disposed upstream of the first valve 23. The faucet is connected upstream to a conduit 10 for cold water and a conduit 11 for hot water. In the embodiment illustrated in FIG. 1, the faucet precedes the supply pipe 30. In other applications, the faucet 45 is directly connected to (interconnected with) the first valve. There are also embodiments in which valves corresponding to the first valve 23 are placed ahead of the faucet, i.e. in the conduits 10 and 11 for cold and hot water, respectively. Customary non-return valves 12 and 13 are disposed in connection with the conduits 10 and 11 for cold and hot water, respectively, in order to prevent the return flow of water from the faucet into the conduits 10 and 11 for cold and hot water. A tank 25 for water (hereafter also designated first tank) is connected into the first conduit 24. That section of the first conduit 24 which, in the illustrated embodiment, is located most proximal the supply pipe 30 will hereinafter be designated the first conduit section 24a, while that section of the first conduit 24 which runs between the tank 25 and the first shower 20 will hereafter be designated the second conduit section 24b.

In the embodiment illustrated in the Figure, a pump 33 is connected in the second conduit section 24b, i.e. downstream of the first tank 25. The pump is followed by a device 26 for supplying a disinfectant to that water which is fed to the first shower 20. From the device 26, the second conduit section 24b continues to the first shower 20. The device 26 is, via a non-return valve 36, connected to a tank 35 for the disinfectant, hereafter also designated the second tank. The non-return valve is turned such that the transport of water from the device 26 to the second tank 35 is prevented. In certain embodiments, the second tank 35 is connected so as to supply the disinfectant to the first tank 25. In a preferred application of the present invention, use is made of disinfectant in liquid form. In such instance, the device 26 for supplying disinfectant to that water which is fed to the first shower 20 is as a rule designed as an injector 26.

The first tank 25 is disposed to be filled to a highest filling level at which the distance between its liquid surface 28 and the discharge mouth 37 of the first conduit section 24a amounts to at least approx. 1 cm, preferably at least approx. 2 cm. There will thus be formed, between the liquid surface 28 and the discharge 37 of the conduit section an air gap 60. A level guard 27 is connected to the first tank 25. In FIG. 1, the level guard is shown as connected to the tank adjacent to the region of its highest filling level, but, in other embodiments, it is placed at a lower level. The level guard 27 is, in the first case, operative to sense the presence of liquid and/or of a liquid surface while, in the latter case, it is operative to sense the pressure of the liquid. In this latter embodiment, the level guard determines the degree of replenishment in the tank on the basis of the sensed pressure of the liquid column in question. In a third embodiment, the level guard is designed as a spillway overflow 39 which, via a conduit 38, leads off liquid from the tank.

A drainage conduit 34 is, as a rule, disposed in connection to the lower end of the tank, preferably in its bottom, and is dimensioned for substantially completely emptying a fully filled tank during a predetermined maximum time, as a rule at most approx. 10 minutes, naturally on condition that no liquid is, at the same time, fed into the tank.

As a rule, the apparatus includes the spillway overflow 39 irrespective of whether this is used as a level guard or as a "safety guard". In the latter case, the spillway overflow is located on a level above the highest filling level adjusted for the level guard 27. However, the spillway overflow is still located at a level which prevents the liquid surface from rising to a level which eliminates the air gap 60 between the liquid surface 28 and the discharge 37 of the first conduit section 24a. In the event of faults entailing that the liquid surface rises uncontrollably, for example because of a malfunction of the level guard 27, the spillway overflow 39 leads the water out of the first tank 25 and ensures that the liquid level stays at a highest level determined by the position of the spillway overflow. Hereby, the spillway overflow maintains the air gap 60 between the liquid surface 28 and the discharge 37 of the first conduit section 24a and thereby obviates the risk of resuction of water from the first tank 25.

Means 31 are provided for transmitting signals from the level guard 27 to the first valve 23 and means 32 for transmitting signals from the level guard 27 to the pump 33. In FIG. 1, means 29 are shown as provided for transmitting signals from the operating device 22 of the first shower 20 to the level guard 27. In one alternative embodiment, the means 29 connect the operating device of the shower 20 to the first valve 23. In the first alternative, the valve 23 is switched by signals from the operating device 22 of the first shower and, in the second alternative, by signals from the level guard 27.

As a rule, the apparatus also includes a second shower 40, a second operating device 42 for turning the second shower on or off, a second conduit 44 for supplying water to the second shower 40 from the supply pipe 30 or a branched supply conduit 30b and a second valve 43 (switch) for opening or closing the flow of water to the second conduit 44. Thus, the second shower is connected to the water mains by means of the supply pipe 30, 30a. It will be obvious that both of the showers are, in certain embodiments, each connected to their supply pipe.

The term supply pipe 30, 30a, 30b is generally taken to signify an outlet conduit from a faucet 45 common to both of the showers 20, 40. Such a common faucet will hereafter generally be designated the main faucet 45. In turn, the faucet is connected via supply conduits 10 and 11 to cold and hot water pipes in a mains network.

As a rule a tap pipe 46, for example for filling water into a bathtub, is also provided in connection with the second shower 40 and is branched from the second conduit 44. In the Figures, the tap pipe is shown as connected to the supply pipe 30b, i.e. downstream of both the main faucet 45 and the second valve 43. In the tap pipe 46, there is provided a third operating device 48 for opening and closing the flow through the tap pipe and a conventional switching device 61 for regulating the size of the flow.

The second valve 43 coupled into the second conduit 44 is connected for signal purposes with the operating device 42 of the second shower 40 and/or the third operating device 48 by means of signal devices 47 and 49, respectively. The second valve 43 is set in the open or closed position by means of signals via these signal devices.

In other embodiments, the shower 40 and the tap pipe 46 are connected to separate supply conduits (not shown). In such instance, faucets and operating devices (not shown) corresponding to the faucet 45, the second operating device 42, the third operating device 48, the second valve 43 and the signal devices 47, 49 are disposed between the second operating device 42 and the third operating device 48, respectively, as well as the second valve 43. As a rule, the switching device 41 of the second shower 40 is included in the second operating device 42, and the switching device 61 of the tap pipe 46 is included in the third operating device 48.

In yet a further embodiment, the tap pipe 46 and the shower 40 are provided with a common operating device (not shown) disposed in the second conduit 44 upstream of the branch of the conduit 44. Analogous with that described in the foregoing, a signal device is provided for transmitting signals between the operating device and the second valve (switch) 43. The conventional switching devices 41, 61, are, in such instance, operative to regulate the magnitude of the liquid flow through the shower 40 and the tap pipe 46, respectively.

Figure 2:
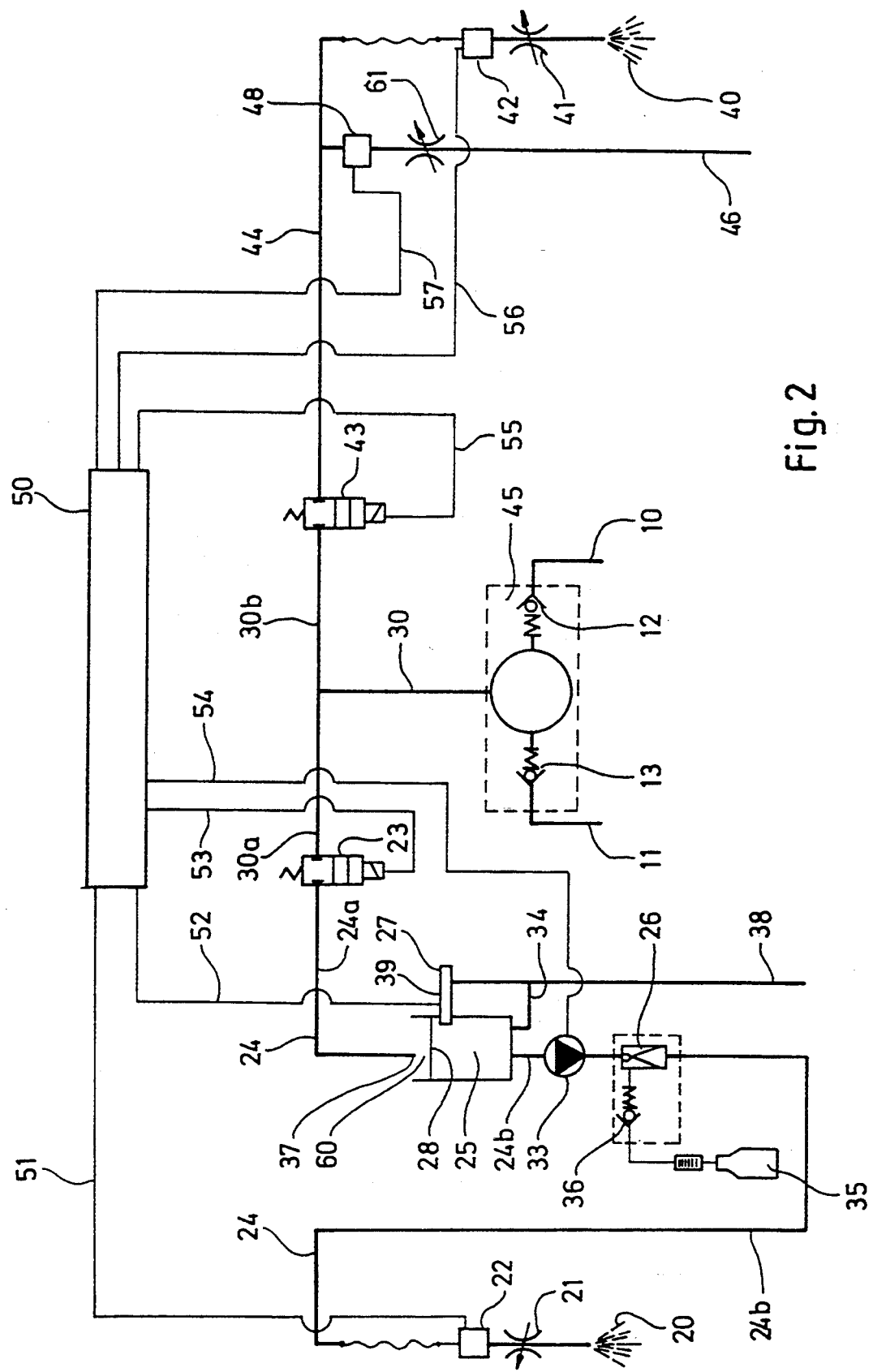
FIG. 2 shows a second embodiment of the apparatus, with central control and regulator devices.

FIG. 2 shows one embodiment in which a central control and regulator device 50 is provided for receiving and/or emitting signals from or to the first operating device 22, the level guard 27, the pump 33 and the first valve 23, respectively.

The control and regulator device 50 is, in signal terms, connected to the first operating device 22 by means of a signal device 51, to the level guard 27 by means of a signal device 52, to the first valve 23 by means of a signal device 53, and to the pump 33 by means of a signal device 54.

In that embodiment in which the second shower 40 and/or the tap pipe 46 are included in the apparatus, the central control and regulator device 50 is disposed for receiving and/or emitting signals from or to, respectively, the second valve 43, the second operating device 42 and/or the third operating device 48. In such instance, the control and regulator device 50 is, in signal terms, connected to the second valve 43 by means of a signal device 55, to the second operating device 42 by means of a signal device 56 and/or to the third operating device 48 by means of a signal device 57.

The above disclosed signal devices consist either of mechanical connections, for example electric leads, or of devices for wireless transmission.

In the embodiment illustrated in FIG. 2, switching of the valve 23 and start and stop of the motor 33 take place, in a first version, through signals from the control and regulator device 50. This, in turn, receives signals from the operating device 22 and from the level guard 27. On the basis of received signals, the control and regulator device switches/adjusts the devices (valve and motor) controlled by the device proper.

Correspondingly, when the second shower 40 and/or the tap pipe 46 are used, switching of the second valve (the switch) 43 takes place through signals from the control and regulator device 50 which, in turn, receives signals from the second operating device 42 and/or the third operating device 48. The control and regulator device 50 thereafter regulates adjustment of the second valve 43.

When the apparatus is put into use, the first shower 20 is turned on by means of the first operating device 22. When the first shower is turned on, the first valve 23 is also opened by signals from the first operating device 22 or the level guard 27 unless the first tank 25 is filled with water to the full level. When water up to a predetermined level (which need not agree with the maximum filling level) is in the first tank 25 or has been supplied to it, the pump 33 starts by signals from the level guard 27, and supplies water from the first tank 25 through the device 26 for the supply of disinfectant. In that application in which the device is designed as an injector, disinfectant is generally supplied from the tank 35 to the water. From the device 26 for supplying disinfectant, the water continues with admixed disinfectant through the second conduit section 24b to the shower 20. In those embodiments in which the tank is coupled to the first tank 25, the disinfectant is supplied to the storage space of the tank.

By degrees as the pump empties water out of the tank 25, new water is fed in through the first conduit section 24a. When the desired quantity of liquid containing disinfectant has passed through the first shower 20, the shower 20 is shut off by means of the first operating device 22. At the same time the valve 23 is closed by signals from the first operating device 22 or the level guard 27, whereby the water supply to the tank 25 for water ceases. Similarly, the pump 33 is stopped by signals from the level guard 27, as well as the supply of disinfectant from the second tank. Any possible remaining liquid in the tank 25 is progressively removed therefrom through the drainage conduit 34.

The air gap 60 between the discharge mouth 37 of the first conduit section 24a and the surface of the liquid located in the tank 25 ensures that any possible partial vacuum in the supply pipe 30 does not entail that water in the tank 25 or water mixed with disinfectant is sucked back into the supply pipe 30. The level guard 27 and/or the spillway overflow 39 always ensure that the distance between the water surface and the discharge 37 is maintained. In order to avoid the risk that water from the tank 25 and/or water with admixed disinfectant can unintentionally be supplied to the first shower 20, water is always removed, when the first shower 20 is shut off, out of the tank 25 through the drainage conduit 34.

When the second shower 40 and/or the tap pipe 46 are used, the water flow to the shower 40 and to the tap pipe, respectively, is opened by means of the second operating device 42 in that the second valve 43 is switched such that water is supplied via the supply pipe 30, 30a to the shower 40 and/or the tap pipe 46.

The above detailed description has referred to but a limited number of embodiments of the present invention, but it will be readily perceived by a person skilled in the art that the present invention encompasses a large number of embodiments without departing from the spirit and scope of the appended claims.

I claim:

1. An apparatus for showering and disinfection of a sanitary facility or sanitary equipment, said apparatus comprising at least a first shower, a first operating device for opening or closing the flow of liquid to said first shower, a first conduit for supplying liquid to said first shower, a tank coupled in said first conduit, said tank having a storage space for liquid, said first conduit including a first conduit section having an outlet for discharging liquid into said tank at a level above a highest permitted filling level in the tank and a first valve in said first conduit section to control liquid flow in said first conduit section; said first conduit further including a second conduit section connected to the storage space of the tank and to said first shower, said second conduit section transporting liquid from the tank to said first shower, said second conduit section being connected to the storage space of the tank at a level located below the highest filling level of the tank; a device being provided for the supply of disinfectant to said tank or to said second conduit section said tank being provided with a level guard to prevent the filling level in the tank from exceeding a predetermined highest filling level, said level guard being connected to said first valve in said first conduit section to close said first valve when the liquid in the tank reaches said predetermined highest filling level thereby to keep said outlet of said first conduit section above the highest liquid level in the tank.

2. The apparatus as claimed in claim 1, wherein said first operating device is connected to the level guard by means for transmitting signals.

3. The apparatus as claimed in claim 2, wherein said level guard is connected to said first valve by means for transmitting signals.

4. The apparatus as claimed in claim 3, comprising a pump in said first conduit, said level guard being connected to said pump by means for transmitting signals.

5. The apparatus as claimed in claim 4, wherein said level guard consists of a spillway overflow.

6. The apparatus as claimed in claim 5, wherein said first operating device, said first valve, said level guard and said pump are connected to a control and regulator device by means of signal devices for transmitting signals between said operating device, first valve, level guard and pump and said control and regulator device; said control and regulator device being operative to control the functions of said first valve and said pump based on incoming signals to said control and regulator device.

7. The apparatus as claimed in claim 6, further comprising a second shower, a second conduit for supplying liquid to said second shower, second operating device in said second conduit for opening or closing the flow of liquid to said second shower, and a second valve in said second conduit, said second valve, and said second operating device being connected, by means of signal devices to said central control and regulator unit for transmitting signals between said control and regulator device and said second valve and said second operating device; said control and regulator device being operative to control the position of said second valve based on incoming signals to said control and regulator device.

8. The apparatus as claimed in claim 4, wherein said level guard is disposed to sense the liquid pressure of a liquid column in said tank.

9. The apparatus as claimed in claim 8, wherein said first operating device, said first valve, said level guard and said pump are connected to a control and regulator device by means of signal devices for transmitting signals between said operating device, first valve, level guard and pump and said control and regulator device; and said control and regulator device being operative to control the functions of said first valve and said pump based on incoming signals to said control and regulator device.

10. The apparatus as claimed in claim 9, further comprising a second shower, a second conduit for supplying liquid to said second shower, a second operating device in said second conduit for opening or closing the flow of liquid to said second shower and a second valve in said second conduit, wherein said second valve, and said second operating device are connected, by means of signal devices to said central control and regulator unit for transmitting signals between said control and regulator device and said second valve and said second operating device; said control and regulator device being operative to control the position of said second valve based on incoming signals to said control and regulator device.

11. The apparatus as claimed in claim 1, wherein said device for supplying disinfectant is coupled in said second conduit section.

12. The apparatus as claimed in claim 11, wherein said device for supplying disinfectant comprises an injector.

13. The apparatus as claimed in claim 1, wherein said tank is provided with a drainage conduit which is connected to the storage space of said tank in the lower region of said storage space.

14. The apparatus as claimed in claim 13, wherein said drainage conduit is disposed and dimensioned for permitting a liquid flow of a magnitude such that a filled tank is substantially completely empty after at most approximately 10 minutes.

15. The apparatus as claimed in claim 1, wherein the distance between the highest filling level of said tank and the outlet end of said first conduit section is at least approximately 1 cm.

16. The apparatus as claimed in claim 1, wherein said first conduit section is connected to a faucet which is located upstream and which is supplied with hot and cold water via hot and cold water conduits.

17. The apparatus as claimed in claim 16, wherein said apparatus includes a second shower which, via a second conduit is connected to the faucet; and a second operating device being provided for opening or closing the flow of water to said second shower.

18. The apparatus as claimed in claim 7, wherein said second operating device is connected, by means for transmitting signals, to a valve for switching the valve between open or closed position; and valve connecting said second shower with said second conduit.

19. The apparatus as claimed in claim 16, wherein said apparatus includes a second shower and a tap pipe which, via a second conduit is connected to the faucet; and second and third operating devices for opening or closing the flow of water to said second shower and said tap pipe, respectively.

20. The apparatus as claimed in claim 19, wherein said second operating device and said third operating device are connected, by means for transmitting signals, to a second valve for switching the valve between open or closed positions; said second valve connecting said faucet with said second conduit.

21. The apparatus as claimed in claim 20, wherein said first operating device, said first valve, said level guard and said pump are connected to a control and regulator device by means of signal devices for transmitting signals between said operating device, first valve, level guard and pump and said control and regulator device; and said control and regulator device being operative to control the functions of said first valve and said pump based on incoming signals to said control and regulator device.

22. The apparatus as claimed in claim 21, wherein said second valve, said second operating device and said third operating device are connected, by means of signal devices to said central control and regulator unit for transmitting signals between said control and regulator device and said second valve, said second operating device and said third operating device; and said control and regulator device being operative to control the position of said second valve based on incoming signals to said control and regulator device.

* * * * *